S. S. Hartshorn.

Buckle.

No. 3,868. Reissued Mar. 1, 1870

Witnesses:

L. H. Lyon

D. Fitzgerald

Inventor:

Sheldon S. Hartshorn

N. PETERS, PHOTO-LITHOGRAPHER, WASHINGTON, D. C.

United States Patent Office.

THE WEST HAVEN BUCKLE COMPANY, OF WEST HAVEN, CONNECTICUT, ASSIGNEES OF SHELDON S. HARTSHORN.

*Letters Patent No.* 29,270, *dated July* 24, 1860; *reissue No.* 3,868, *dated March* 1, 1870.

IMPROVED BUCKLE.

The Schedule referred to in these Letters Patent and making part of the same.

*To all whom it may concern:*

Be it known that SHELDON S. HARTSHORN, late of New Haven, in the county of New Haven, and State of Connecticut, invented a new Improvement in Buckles; and we do hereby declare the following, when taken in connection with the accompanying drawings and the letters of reference marked thereon, to be a full, clear, and exact description of the same, and which said drawings constitute part of this specification, and represent in—

Figure 1:
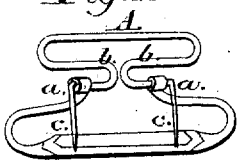
Figure 2:
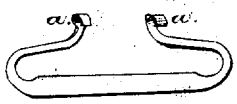

Figure 1, the buckle complete;
Figure 2, the frame; and in
Figure 3, the tongues.

This invention relates to an improvement in that class of buckles used for wearing apparel, the object being to support and strengthen the tongues between the hinge, and frame where the points of the tongues bear; and the invention consists in hinging the frame and tongues together, so that the tongues cross the frame, between the hinge and that part of the frame where the points of the tongue bear.

Fig. 2 represents the frame, which is formed from wire or other suitable metal struck into the required shape, the two ends so as to form loops, as at *a a*, the said two ends being distant from each other less than the length of the frame.

Figure 3:
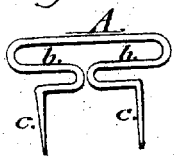

The tongues are formed from wire or other suitable metal, bent into the form substantially as seen in fig. 3, the tongues C C being bent so as to form nearly a right angle at their base, and distant from each other so that the loops *a a* may be clasped around the tongues at their base, as in fig. 1, the tongues reaching over the frame and so as to bear thereon, and extending to and bearing upon the longer side of the frame, by which construction the tongues are supported by the frame between the hinge and their points, so that lighter wire may be used for the tongue than can be done without such support.

It is preferable to form the tongues with the loop A, which is made by bending the tongue-wire into the shape seen in fig. 3, yet this loop is not an essential part of this invention, as other means may be devised for attaching the buckle to the garment, the gist of this invention being the support of the tongues, as before described.

We claim as the invention of the said SHELDON S. HARTSHORN—

A buckle, in which the frame and tongues are constructed substantially as herein described, so that the tongues will cross and be supported by the frame, between the hinge and points of the tongue.

GEO. R. KELSEY,
*Treasurer of West Haven Buckle Company.*

Witnesses:
A. J. TIBBITTS,
J. H. SHUMWAY.